(12) United States Patent
Yu

(10) Patent No.: US 12,358,692 B2
(45) Date of Patent: Jul. 15, 2025

(54) INJECTION MOLDED ARTICLES AND MOLD APPARATUSES FOR FORMING SAME

(71) Applicant: Cap-Thin Molds Inc., Mississauga (CA)

(72) Inventor: David Yu, Mississauga (CA)

(73) Assignee: Cap-Thin Molds Inc., Mississauga (CA)

( * ) Notice: Subject to any disclaimer, the term of this patent is extended or adjusted under 35 U.S.C. 154(b) by 796 days.

(21) Appl. No.: 17/447,870

(22) Filed: Sep. 16, 2021

(65) Prior Publication Data

US 2022/0080635 A1 Mar. 17, 2022

Related U.S. Application Data

(60) Provisional application No. 63/079,724, filed on Sep. 17, 2020.

(51) Int. Cl.
| | |
|---|---|
| B65D 41/18 | (2006.01) |
| B29C 45/04 | (2006.01) |
| B29C 45/26 | (2006.01) |
| B29C 45/44 | (2006.01) |
| B65D 41/04 | (2006.01) |
| B29L 31/56 | (2006.01) |

(52) U.S. Cl.
CPC .......... *B65D 41/18* (2013.01); *B29C 45/0441* (2013.01); *B29C 45/2602* (2013.01); *B29C 45/262* (2013.01); *B29C 45/44* (2013.01); *B65D 41/0421* (2013.01); *B29L 2031/56* (2013.01); *B65D 2543/00296* (2013.01); *B65D 2543/00833* (2013.01)

(58) Field of Classification Search
CPC ................ B65D 41/18; B65D 41/0421; B65D 2543/00296; B65D 2543/00833; B29C 45/0441; B29C 45/2602; B29C 45/262; B29C 45/44; B29L 2031/56
See application file for complete search history.

(56) References Cited

U.S. PATENT DOCUMENTS

| | | | | |
|---|---|---|---|---|
| 3,944,104 | A | * 3/1976 | Watson .............. | B65D 41/0421 215/354 |
| 2014/0097106 | A1 | * 4/2014 | Broekaert .......... | B65D 81/3211 206/222 |

(Continued)

*Primary Examiner* — Shawn M Braden
(74) *Attorney, Agent, or Firm* — SMART & BIGGAR LP; James Raakman

(57) ABSTRACT

An injection molded article includes: (a) an article first portion having internal threading extending helically about an article axis, the threading configured to be formed by a thread mold in a mold core; and (b) an article second portion spaced radially apart from the article first portion and connected to the article first portion by a connection portion. The article second portion has at least one ejection-assist rib configured to be formed by at least one rib mold feature in the mold core. The ejection-assist rib defines a helical slide surface extending helically about the article axis. During an initial unscrewing rotation of the molded article relative to the mold core, the rib mold feature of the mold core bears against the slide surface of the ejection-assist rib to urge the article second portion axially away from the mold core during ejection of the molded article from the mold core.

19 Claims, 10 Drawing Sheets

(56) References Cited

U.S. PATENT DOCUMENTS

2016/0263795 A1    9/2016  Jebely
2018/0281254 A1*  10/2018  Varkey .................. B65D 41/02
2018/0312308 A1*  11/2018  Hein ..................... B65D 41/04
2021/0086955 A1*   3/2021  Charnay ............ B65D 41/0421

* cited by examiner

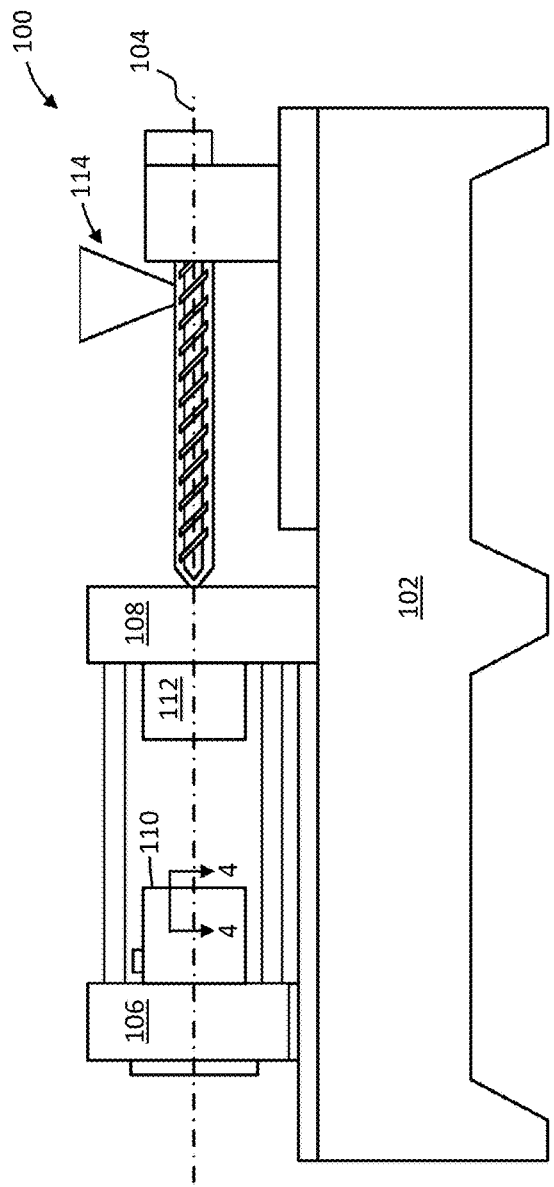
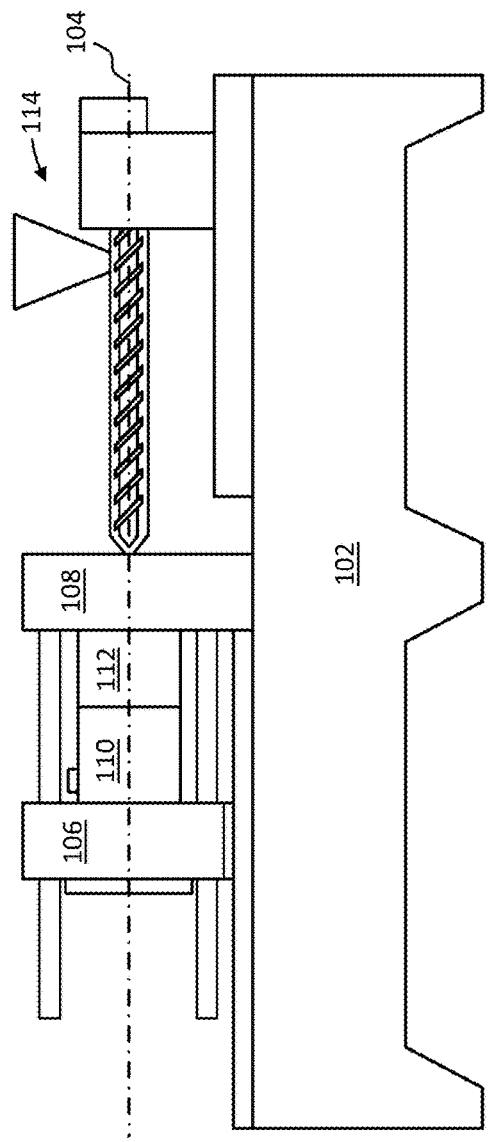

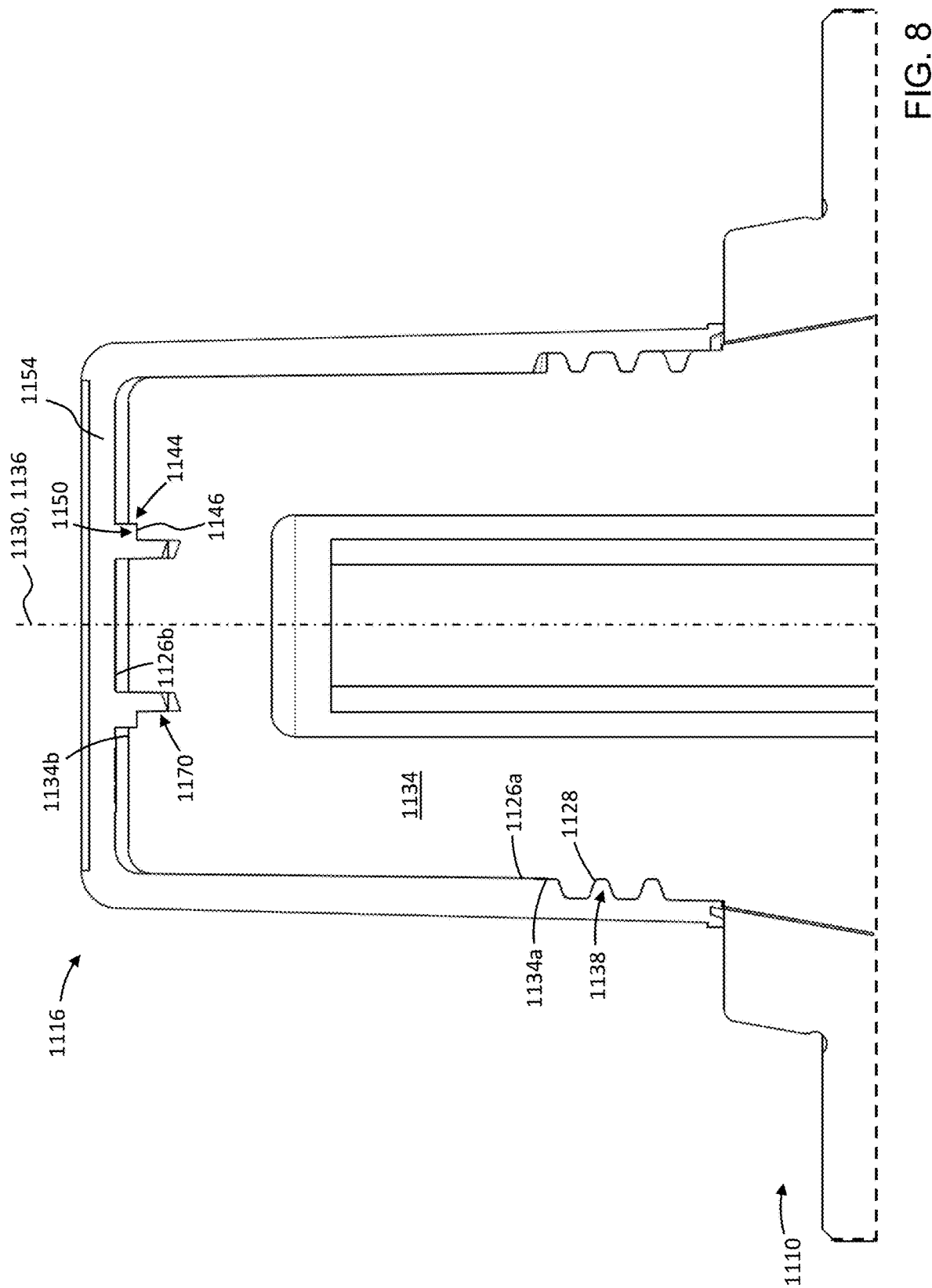

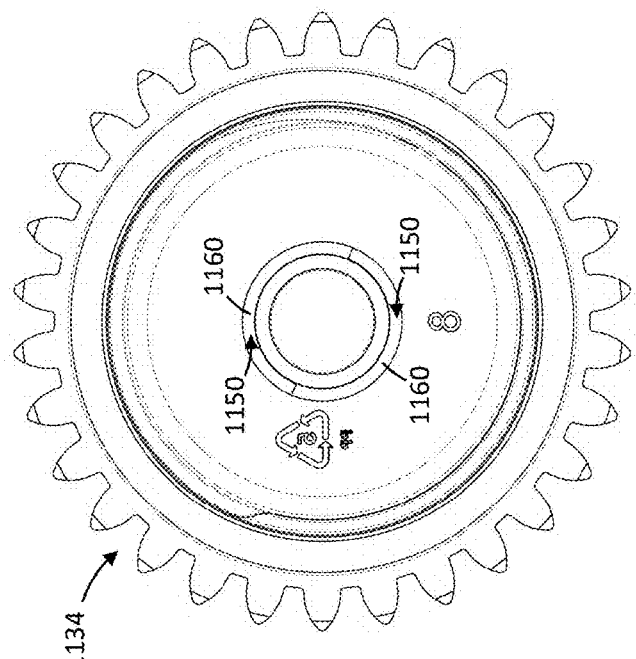
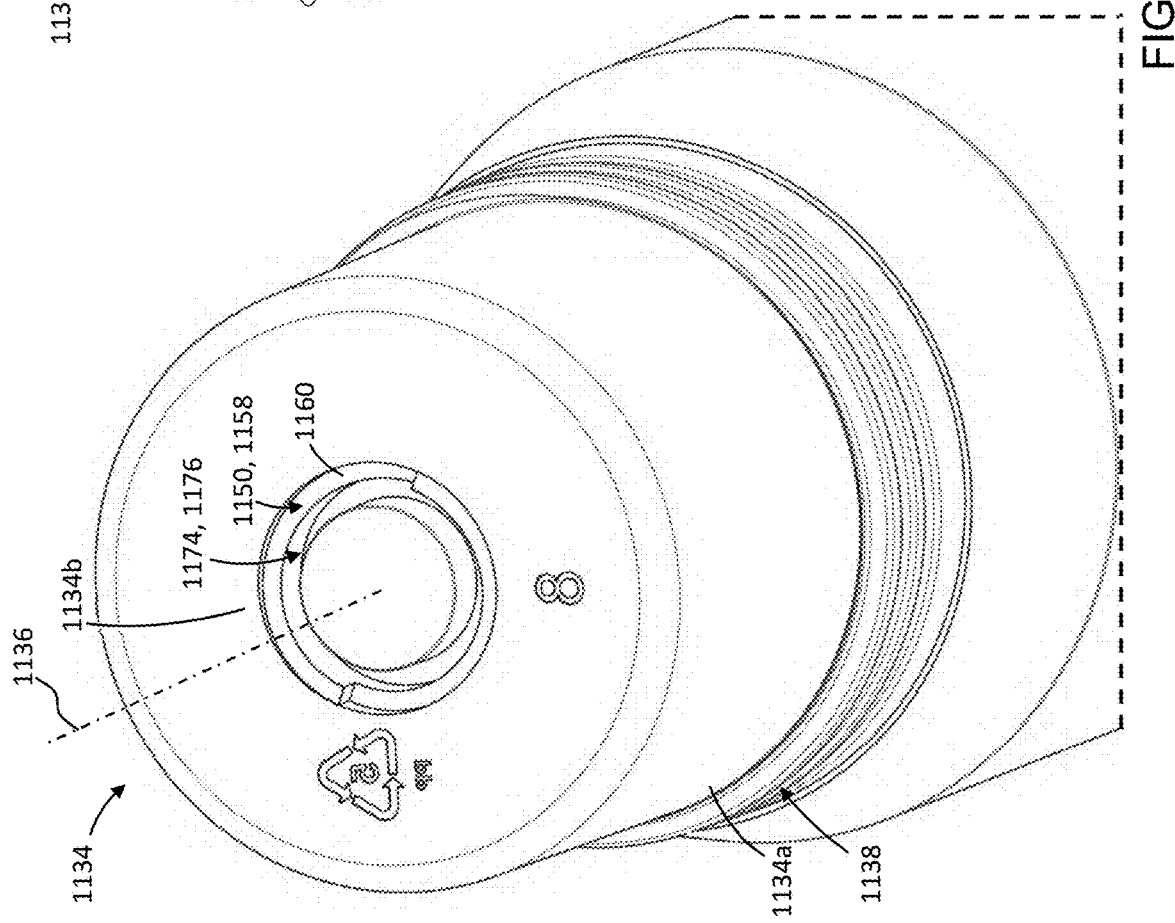

INJECTION MOLDED ARTICLES AND MOLD APPARATUSES FOR FORMING SAME

RELATED APPLICATIONS

This application claims the benefit of Provisional Application Ser. No. 63/079,724, filed Sep. 17, 2020, which is hereby incorporated herein by reference.

FIELD

The specification relates generally to injection molding, and more specifically, to injection molded articles and mold apparatuses for forming same.

BACKGROUND

U.S. Pat. App. Pub. No. 2016/0263795 A1 (Jebely et al.) discloses a mold apparatus for producing a molded article by injection molding including (a) a base plate for mounting to a platen of an injection molding machine; (b) a core plate movably coupled to the base plate and axially translatable relative to the base plate between a plate advanced position and a plate retracted position; (c) a lead screw rotatably supported by, and axially fixed relative to, the base plate; and (d) a lead nut coupled to the lead screw and rotationally fixed relative to the core plate. The lead nut is translatable in response to rotation of the lead screw between a first and a second abutment surface fixed relative to the core plate. The lead nut alternately bears against the first abutment surface for moving the core plate to the plate advanced position and the second abutment surface for moving the core plate to the plate retracted position.

SUMMARY

The following summary is intended to introduce the reader to various aspects of the applicant's teaching, but not to define any invention.

According to some aspects, an injection molded article includes: (a) an article first portion having internal threading extending helically about an article axis, the threading configured to be formed by a thread mold in a mold core; and (b) an article second portion spaced radially apart from the article first portion and connected to the article first portion by a connection portion. The article second portion has at least one ejection-assist rib configured to be formed by at least one rib mold feature in the mold core. The ejection-assist rib defines a helical slide surface extending helically about the article axis. During an initial unscrewing rotation of the molded article relative to the mold core, the rib mold feature of the mold core bears against the helical slide surface of the ejection-assist rib to urge the article second portion axially away from the mold core during ejection of the molded article from the mold core.

In some examples, the ejection-assist rib projects axially along the article axis to an axial endface of the rib, the axial endface of the rib defining the helical slide surface.

In some examples, the ejection-assist rib extends circumferentially from a first end to a second end, and has an axial thickness increasing from the first end to the second end.

In some examples, the article second portion includes at least one retaining feature projecting axially along the article axis and configured to be formed by a retaining mold feature in the mold core. In some examples, the retaining feature comprises a protrusion radially adjacent the ejection-assist rib.

In some examples, the article comprises an axial endwall defined at least in part by the article second portion and the connection portion, the axial endwall configured to be formed by an axial endface of the mold core, wherein the axial endface of the mold core comprises the rib mold feature.

In some examples, the article comprises a radial sidewall defined at least in part by the article first portion, the sidewall configured to be formed by a radial surface of the mold core.

In some examples, the article second portion comprises a plurality of the ejection-assist ribs. In some examples, the plurality of ejection assist ribs includes a first rib and a second rib. In some examples, the first rib and second rib have a common rib radius. In some examples, the first rib extends circumferentially about a first portion of one revolution about the article axis, and the second rib extends circumferentially about a second portion of one revolution of about the article axis, with the first portion and second portion extending along distinct portions of one revolution about the article axis. In some examples, the first and second ribs have different radii, with the first rib having a first rib radius and the second rib having a second rib radius. In some examples, the first and second ribs are radially adjacent and extend along a common portion of one revolution about the article axis. In some examples, radially adjacent first and second ribs are oriented about the axis such that the respective first and second helical slide surfaces are rotationally offset from one another by an angle generally equal to 360 degrees divided by the number of ribs.

In some examples, the article second portion is spaced radially inwardly apart from the article first portion by the connection portion.

In some examples, the helical slide surface of the ejection-assist rib has a rib pitch and the internal threading has a thread pitch. In some examples, the rib pitch is equal to the thread pitch, defining a common pitch, so that the axial advancement of the slide surface per amount of rotation is equal to the axial advancement of the threads, and engagement of the slide surface and the mold core maintains the axial position of the second article portion relative to the first article portion. In some examples, the rib pitch is greater than the thread pitch, so that engagement of the slide surface and the mold core exerts an axial outward force on the article second portion relative to the article first portion. In some examples the rib pitch is less than the thread pitch, so that axially inward deflection of the second article portion relative to the first article portion is limited to the extent of an axial gap formed between slide surface and the mold core upon initial rotation of the mold core relative to the article for demolding.

According to some aspects, a mold core for forming an injection molded article includes: (a) a first mold surface having a thread mold extending helically about a core axis for forming internal threading in an article first portion of the molded article; and (b) a second mold surface spaced radially apart from the first mold surface, the second mold surface for forming an article second portion spaced radially apart from the article first portion and connected to the article first portion by a connection portion. The second mold surface has at least one rib mold feature for forming at least one ejection-assist rib of the article second portion, the ejection-assist rib having a helical slide surface extending helically about the article axis. During an initial unscrewing rotation of the molded article relative to the mold core, the rib mold feature bears against the helical slide surface to urge the article second portion axially away from the mold core during ejection of the molded article.

In some examples, the rib mold feature comprises a rib mold cavity in the second mold surface.

In some examples, the rib mold cavity extends along the core axis to an axially inner end, the axially inner end defining a helical cavity surface extending helically about the core axis for forming and bearing against the helical slide surface of the molded article.

In some examples, the mold core comprises an axial endface defined at least in part by the second mold surface, and the rib mold cavity is in the axial endface of the mold core.

In some examples, the helical cavity surface and the thread mold have a common pitch. In some examples, the helical cavity surface and the thread mold have a different pitch.

In some examples, the second mold surface comprises at least one retaining mold feature for forming a retaining feature of the article second portion.

In some examples, the retaining mold feature projects axially along the core axis and is radially adjacent the rib mold feature.

In some examples, the second mold surface comprises a plurality of the rib mold features for forming a plurality of the ejection-assist ribs.

In some examples, the second mold surface is spaced radially inward of the first mold surface.

According to some aspects, a method of facilitating ejection of an injection molded article having internal threading formed by a mold core includes: (a) rotating the mold core relative to the molded article about a core axis at a rotational rate while simultaneously advancing the molded article relative to the mold core along the core axis at an advancement rate corresponding to the rotational rate to unscrew the internal threading from the mold core; and (b) wherein the rotating step in (a) includes circumferentially advancing a helical cavity surface of the mold core relative to the molded article to bear the helical cavity surface against a helical slide surface formed on the molded article by the helical cavity surface and exert an axial ejection force on a portion of the molded article spaced radially apart from the internal threading.

According to some aspects, an injection molded article includes (a) a sidewall extending along an axis and formed by a radial surface of a mold core, and (b) an endwall formed by an axial endface of the mold core. The endwall has at least one ejection-assist rib projecting axially from an interior surface of the endwall and configured to be formed by at least one rib mold feature in the endface of the mold core. The ejection-assist rib defines a helical slide surface extending helically about the axis. During an initial ejection rotation of the mold core about the axis relative to the molded article, the rib mold feature of the mold core bears against the helical slide surface of the ejection-assist rib to urge the endwall axially away from the mold core.

According to some aspects, a mold core for forming an injection molded article includes: (a) a radial surface extending along an axis for forming a sidewall of the molded article; and (b) an axial endface for forming an endwall of the molded article, the axial endface having at least one rib mold feature for forming at least one ejection-assist rib projecting axially from an interior surface of the endwall, the ejection-assist rib having a helical slide surface extending helically about the axis.

During an initial ejection rotation of the mold core about the axis relative to the molded article, the rib mold feature bears against the helical slide surface to urge the endwall of the molded article axially away from the mold core.

BRIEF DESCRIPTION OF THE DRAWINGS

The drawings included herewith are for illustrating various examples of articles, methods, and apparatuses of the present specification and are not intended to limit the scope of what is taught in any way. In the drawings:

FIG. 1A is an elevation view of an example injection molding machine in a mold-open position;

FIG. 1B is an elevation view of the machine of FIG. 1A in a mold-closed position;

FIG. 8 is a cross-sectional view of portions of another example mold apparatus for forming another injection molded article, the article shown partially unscrewed from a core portion of the mold apparatus;

FIG. 10 is a perspective view of a core portion of the mold apparatus of FIG. 8; and FIG. 11 is an end view of the core portion of FIG. 10.

DETAILED DESCRIPTION

Figure 2:
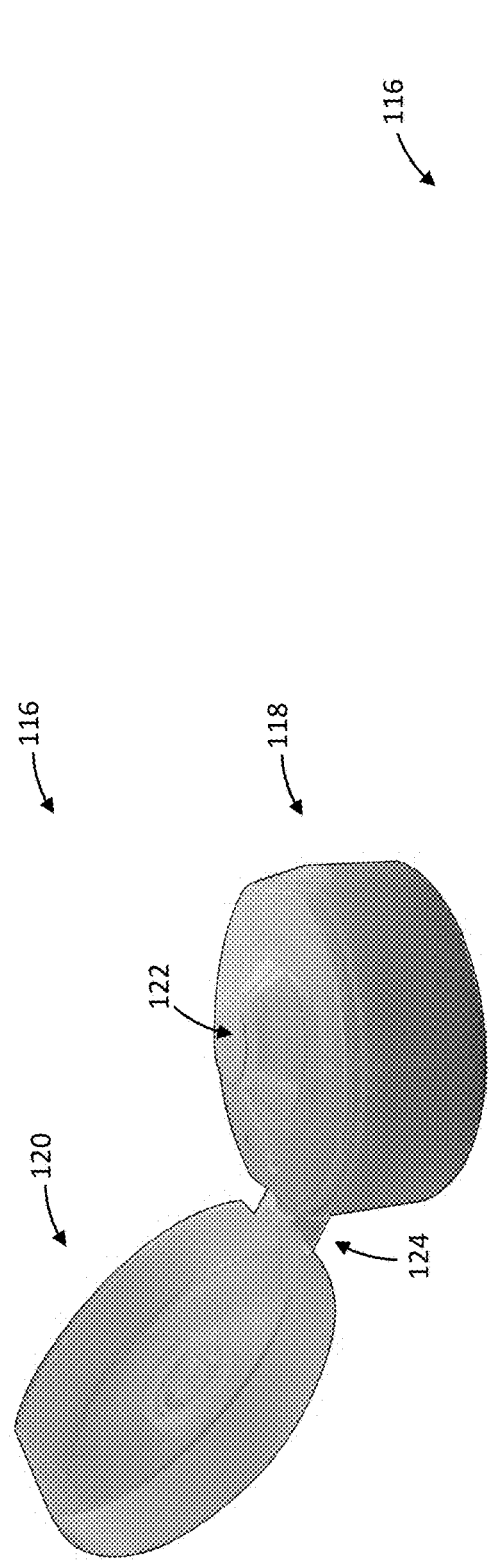
FIG. 2 is a top perspective view of an example injection molded article manufactured by the injection molding machine of FIG. 1A, the molded article shown in an open position.

Various articles, apparatuses, or processes will be described below to provide an example of an embodiment of each claimed invention. No embodiment described below limits any claimed invention and any claimed invention may cover articles, processes, or apparatuses that differ from those described below. The claimed inventions are not limited to articles, apparatuses, or processes having all of the features of any one article, apparatus, or process described below or to features common to multiple or all of the articles, apparatuses, or processes described below. It is possible that an article, apparatus, or process described below is not an embodiment of any claimed invention. Any invention disclosed in an article, apparatus, or process described herein that is not claimed in this document may be the subject matter of another protective instrument, for example, a continuing patent application, and the applicants, inventors, or owners do not intend to abandon, disclaim, or dedicate to the public any such invention by its disclosure in this document.

During ejection of an injection molded article from a mold, portions of the article may be forced to demold from mold surfaces through deflection. Some molded articles, such as those with thin-walled or other geometries, may be prone to undesirable deformation resulting from such deflection, particularly if not sufficiently cooled prior to ejection. In some cases, this may result in requiring extended cooling times and/or overly complex and expensive ejection systems to help reduce ejection defects.

According to some aspects of the present disclosure, ejection-assist features are disclosed that can facilitate ejection of molded articles. For some applications, the ejection-assist features of the present disclosure may help reduce required cooling times, ejection defects, and/or cost relative to some other ejection solutions.

Referring to FIG. 1A, an example injection molding machine 100 includes a machine base 102 extending lengthwise along a machine axis 104. A pair of platens, including a first platen 106 and a second platen 108, are supported by the machine base 102. The first platen 106 carries a first mold apparatus 110 and the second platen 108 carries a second mold apparatus 112 of a mold. At least one tie bar extends generally between the first and second platens 106, 108 for exerting a clamp load across the platens when stretched. The first platen 106 can translate toward and away from the second platen 108 along the machine axis 104 to close and open the mold. When in the mold-open position (FIG. 1A), the mold apparatuses 110, 112 are spaced axially apart from each other. When in the mold-closed position (FIG. 1B), the mold apparatuses 110, 112 are in contact with each other and form at least one enclosed cavity to be filled with plastic melt (e.g., from an injection unit 114) for forming an injection molded article.

Referring to FIG. 2, an example injection molded article 116 manufactured by the machine 100 is illustrated. In the example illustrated, the article 116 has a first part 118 and a second part 120 joined to the first part 118. In the example illustrated, the article 116 is in the form of a flip-top lid for a container, with the first part 118 comprising a closure body having a dispensing orifice 122 and the second part 120 comprising a cap engageable with the closure body to seal closed the dispensing orifice 122. In the example illustrated, the first and second parts 118, 120 are joined together by a living hinge 124 formed integrally with the first and second parts 118, 120.

Figure 3:
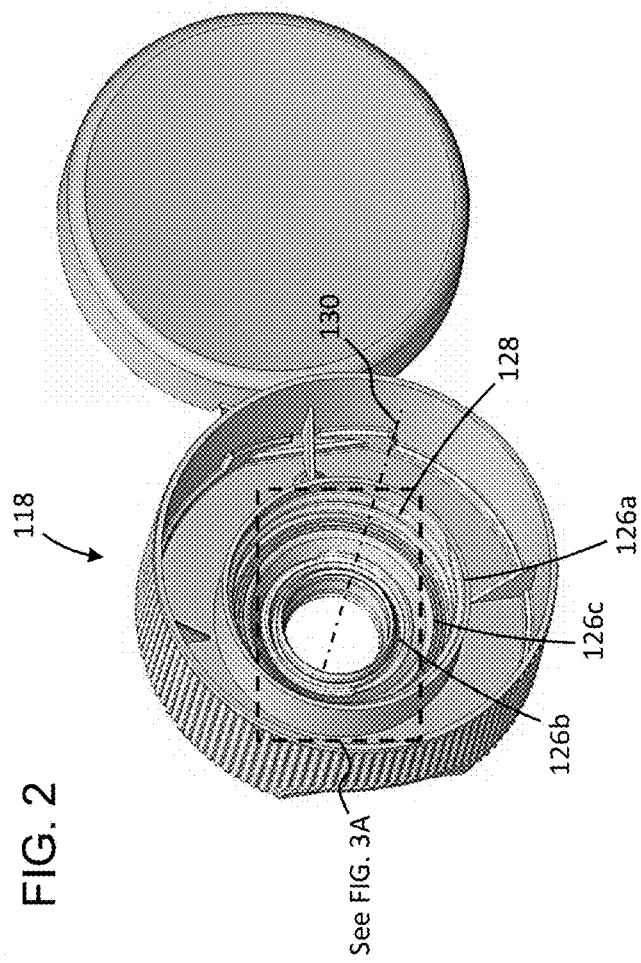
FIG. 3 is a bottom perspective view of the injection molded article of FIG. 2.

Referring to FIG. 3, in the example illustrated, the first part 118 of the article 116 comprises an article first portion 126a having internal threading 128 extending helically about an article axis 130. In the example illustrated, the internal threading 128 is configured to cooperate with complementary threading on the container for installing the article 116 thereon.

In the example illustrated, the first part 118 of the article 116 further comprises an article second portion 126b spaced radially apart from the article first portion 126a and connected to the article first portion 126a by an article third portion 126c (also referred to herein as connection portion 126c). In the example illustrated, the article second portion 126b is spaced radially inwardly apart from the article first portion 126a by the connection portion 126c.

Figure 4:
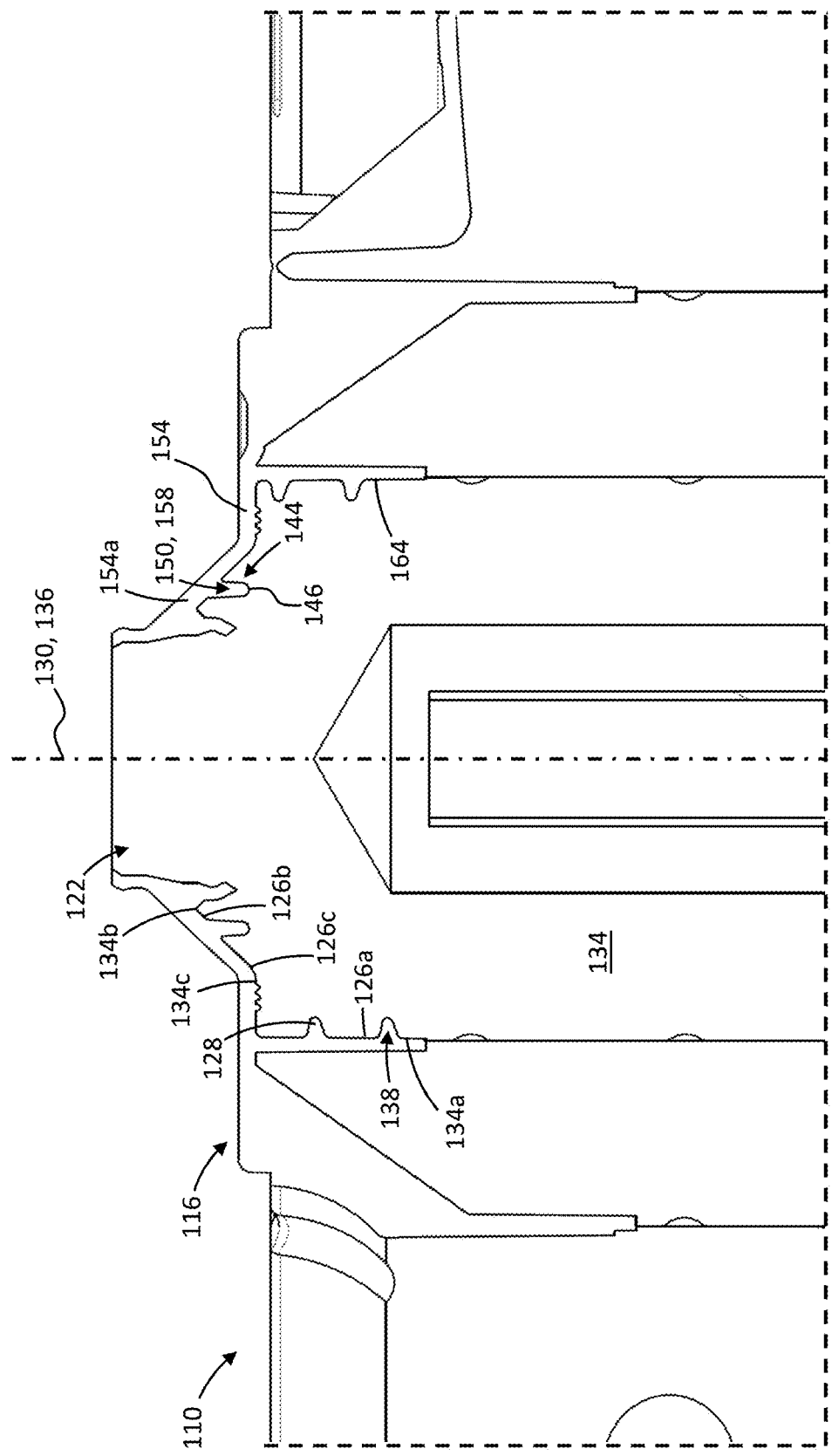
FIG. 4 is a cross-sectional view of an example mold apparatus of the machine of FIG. 1A, taken along line 4-4 in FIG. 1A, and showing the injection molded article of FIG. 2 on the mold apparatus after formation and prior to ejection.

Referring to FIG. 4, in the example illustrated, the first mold apparatus 110 includes a first mold core 134 extending along a core axis 136 and having a first mold surface 134a for forming the article first portion 126a. In the example illustrated, the first mold surface 134a comprises a thread mold 138 extending helically about the core axis 136 for forming the internal threading 128. In the example illustrated, the first mold core 134 has a second mold surface 134b spaced radially apart from the first mold surface 134a for forming the article second portion 126b, and a third mold surface 134c extending radially between the first and second mold surfaces 134a, 134b for forming the connection portion 126c of the molded article 116. In the example illustrated, the second mold surface 134b is spaced radially inwardly from the first mold surface 134a by the third mold surface 134c.

Figure 3A:
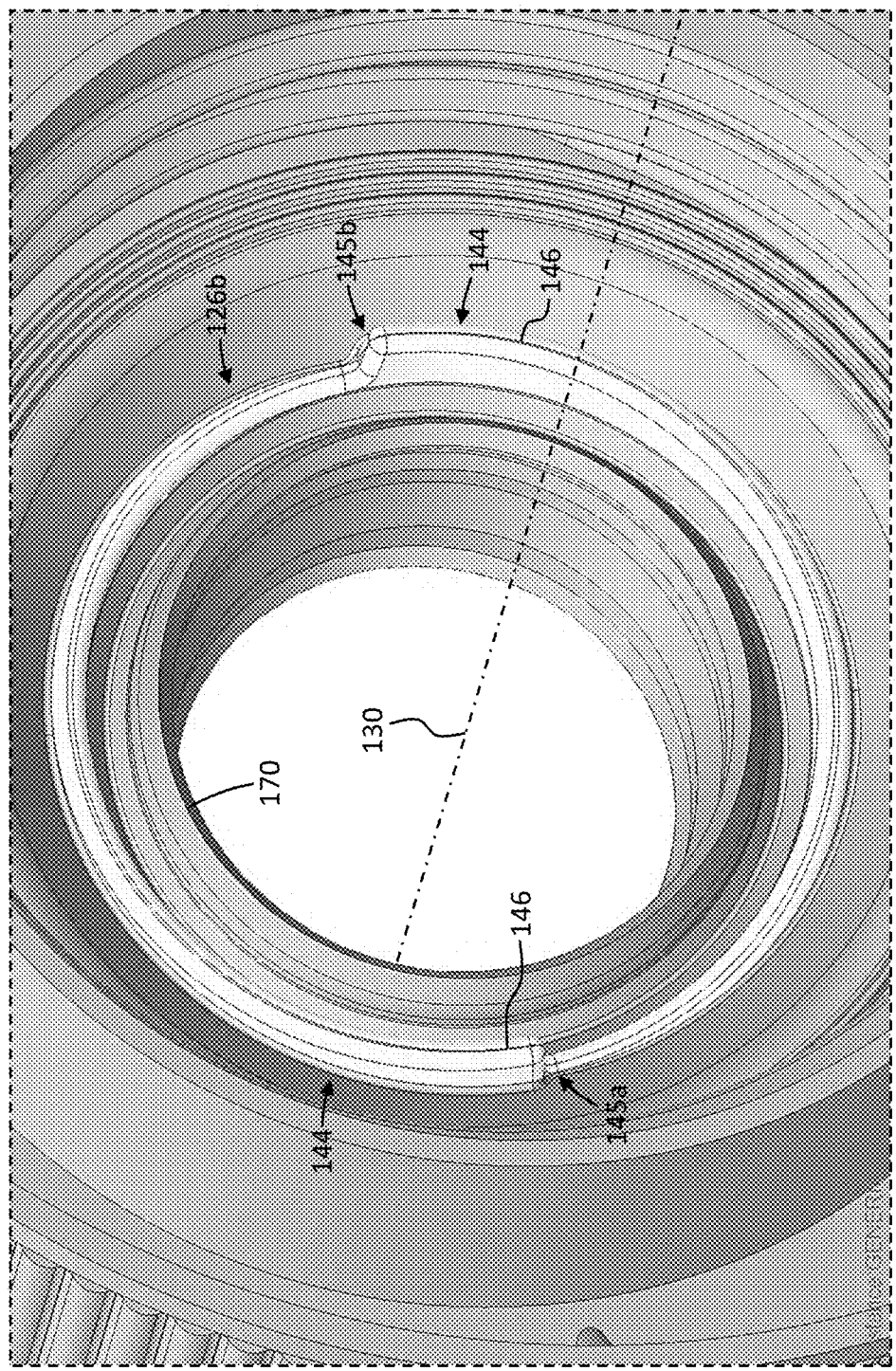
FIG. 3A is an enlarged view of a portion of FIG. 3.

In the example illustrated, the article second portion 126b comprises at least one ejection-assist rib 144. Referring to FIG. 3A, in the example illustrated, the ejection-assist rib 144 defines a helical slide surface 146 extending helically about the article axis 130. Referring to FIG. 4, in the example illustrated, the first mold core 134 has at least one rib mold feature 150 (see also FIG. 6) in the second mold surface 134b for forming the at least one ejection-assist rib 144.

Figure 5:
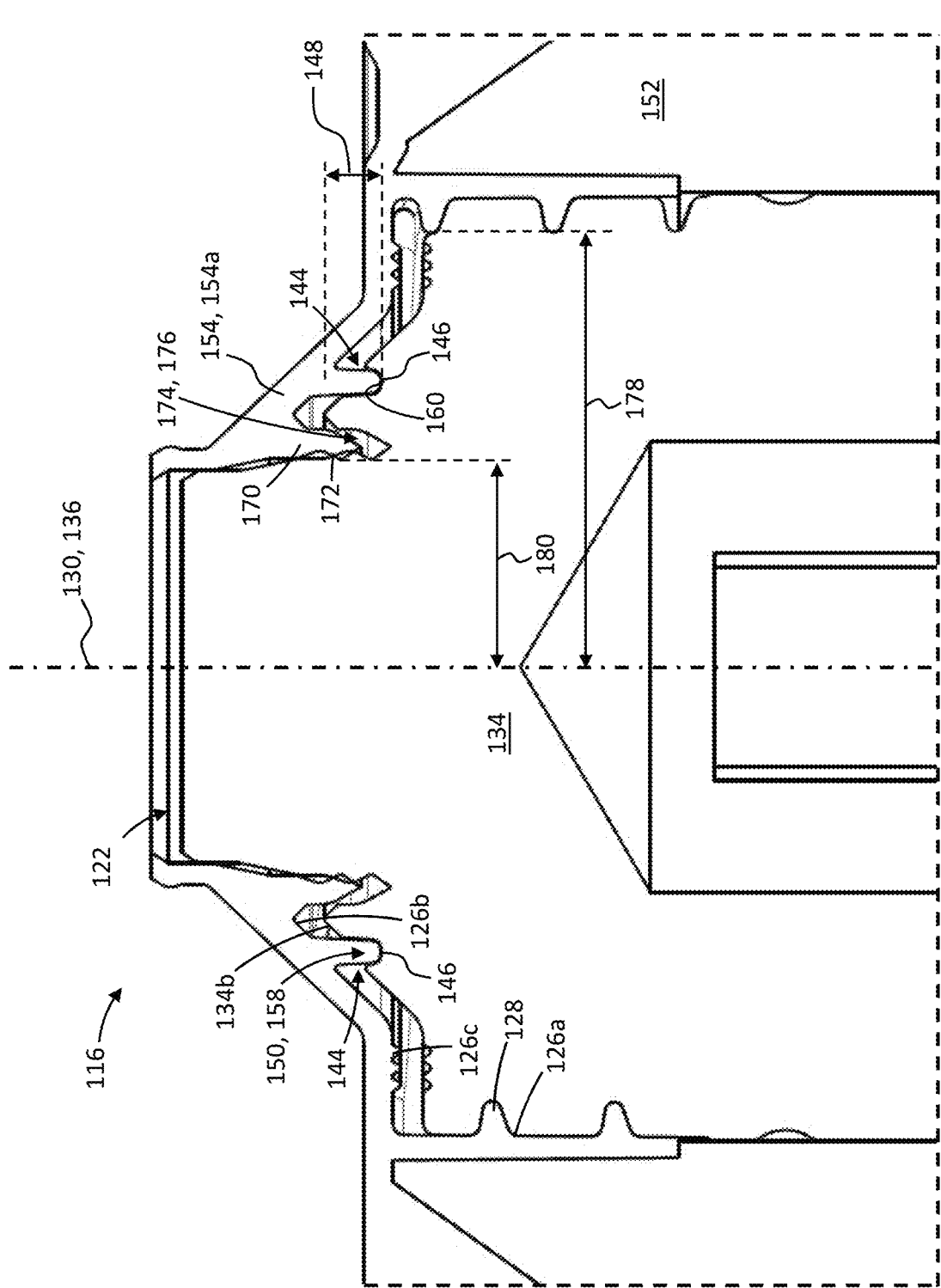
FIG. 5 is a cross-sectional view like that of FIG. 4, but showing the molded article partially unscrewed from a core portion of the mold apparatus.

Referring to FIG. 5, in the example illustrated, the first mold core 134 is rotatable about the core axis 136 relative to the molded article 116 at a rotational rate, and the molded article 116 is advanceable relative to the first mold core 134 along the core axis 136 at an advancement rate corresponding to the rotational rate for unscrewing the molded article 116 from the first mold core 134. In the example illustrated, the first mold apparatus 110 includes at least one second mold core 152 for forming additional portions of the molded article 116. In the example illustrated, when formed, the additional portions rotationally lock the molded article 116 relative to the second mold core 152, and the second mold core 152 is translatable along the core axis 136 relative to the first mold core 134 to push the molded article 116 along the core axis at the advancement rate to facilitate unscrewing of the molded article 116.

In the example illustrated, during an initial unscrewing rotation of the molded article 116 relative to the first mold core 134, the rib mold feature 150 of the first mold core 134 bears against the helical slide surface 146 of the ejection-assist rib 144 to urge the article second portion 126b axially away from the first mold core 134 during ejection of the molded article 116. This can help to, for example, limit axially inward deflection of the article second portion 126b relative to the article first portion 126a during demolding of the article second portion 126b from the first mold core 134, and may help reduce the required cooling time and the likelihood of ejection defects in the molded article 116.

In the example illustrated, the helical slide surface 146 of the ejection-assist rib 144 and the internal threading 128 have a common handedness and a common pitch. This can facilitate demolding and advancement of the article second portion 126b at the same rate as the article first portion 126a during unscrewing of the molded article 116, which can help reduce undesirable deformation of the molded article 116 during ejection. In other examples, the pitch of the helical slide surface can be selected to be less than the pitch of the internal threading 128. This may delay advancement (and demolding) of the article second portion 126b relative to the article first portion 126a. In some examples, the pitch of the helical slide surface can be selected to be greater than the pitch of the internal threading 128. This may increase an initial rate of advancement of the article second portion 126b relative to the article first portion 126a.

In the example illustrated, the ejection-assist rib 144 projects axially inwardly along the article axis 130 to an axial endface defining the helical slide surface 146. Referring to FIG. 4, in the example illustrated, the article 116 comprises an axial endwall 154 defined at least in part by the article second portion 126b and the connection portion 126c. In the example illustrated, the endwall 154 extends radially inwardly from the article first portion 126a to the dispensing orifice 122 of the molded article 116. In the example illustrated, the ejection-assist rib 144 projects axially from an interior surface of the endwall 154 to the helical slide surface 146 of the rib 144. In the example illustrated, the endwall 154 has a frustoconical portion 154*a* defined at least in part by the article second portion 126*b*, and the ejection-assist rib 144 projects axially from an underside of the frustoconical portion 154*a*. Referring to FIG. 3A, in the example illustrated, the ejection-assist rib 144 extends circumferentially from a first end 145*a* to a second end 145*b*, and has an axial thickness 148 (FIG. 5) increasing from the first end 145*a* to the second end 145*b*. In the example illustrated, the axial thickness 148 is between the interior surface of the endwall 154 and the helical slide surface 146.

Referring to FIG. 5, in the example illustrated, the mold core 134 comprises an axial endface defined at least in part by the second and third mold surfaces 134*b*, 134*c*, the axial endface for forming the endwall 154. In the example illustrated, the rib mold feature 150 is in the axial endface of the first mold core 134. In the example illustrated, the rib mold feature 150 comprises a rib mold cavity 158 in the second mold surface 134*b* of the mold core 134.

Figure 6:
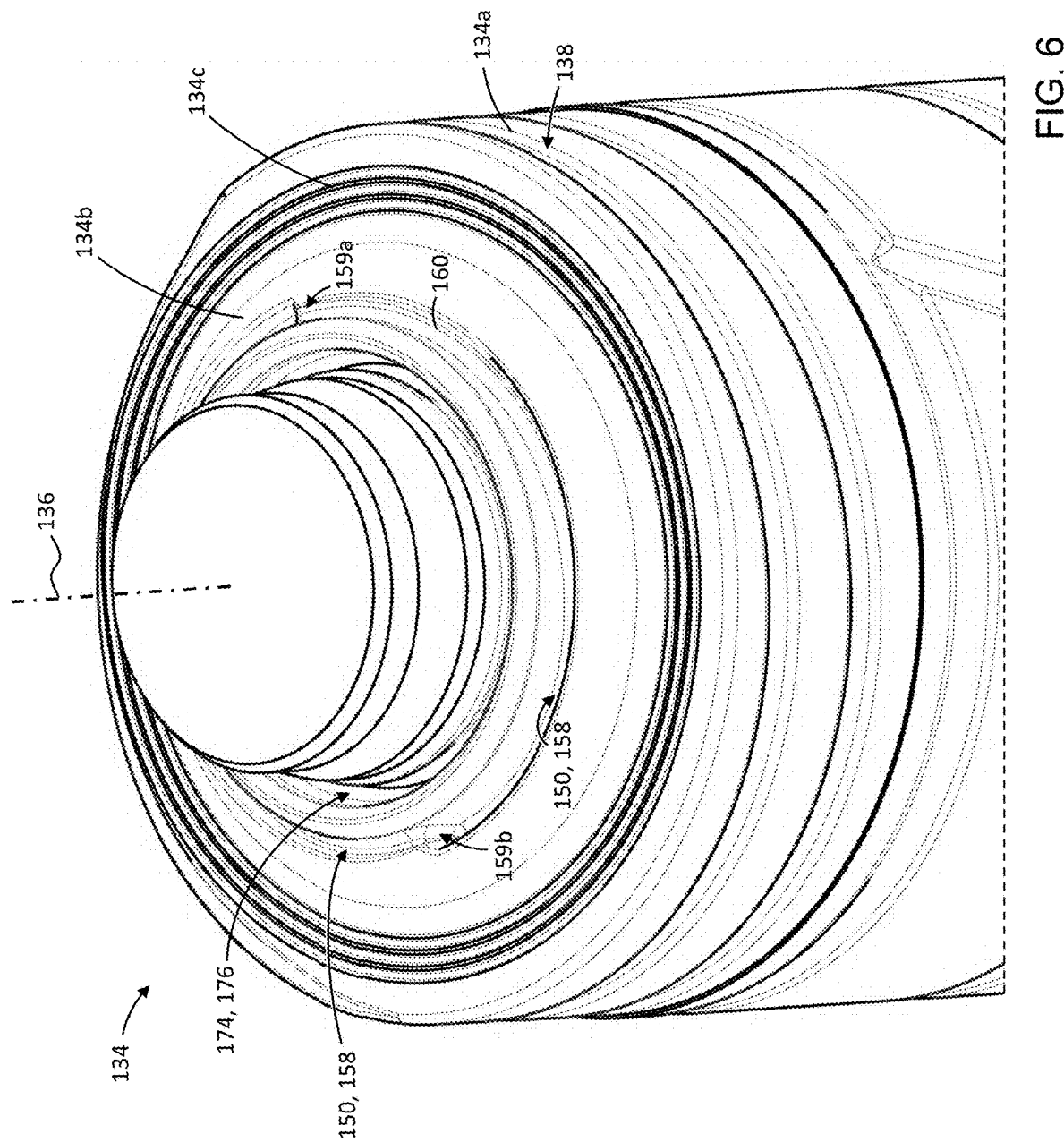
FIG. 6 is a perspective view of the core portion of the mold apparatus of FIG. 4.

Referring to FIG. 6, in the example illustrated, the rib mold cavity 158 extends along the core axis 136 to an axially inner end defining a helical cavity surface 160 extending helically about the core axis 136 for forming the helical slide surface 146 (FIG. 3A) of the molded article 116, and for bearing against the helical slide surface 146 (FIG. 3A) to push the article second portion 126*b* away from the first mold core 134 during an initial unscrewing rotation. In the example illustrated, the helical cavity surface 160 and the thread mold 138 have a common handedness and a common pitch. In the example illustrated, the rib mold cavity 158 extends circumferentially from a first end 159*a* to a second end 159*b*, and has a cavity depth increasing from the first end 159*a* to the second end 159*b*.

Referring to FIG. 4, in the example illustrated, the article 116 comprises a radial sidewall 164 defined at least in part by the article first portion 126*a*. In the example illustrated, the radial sidewall 164 extends axially from the endwall 154. In the example illustrated, the radial sidewall 164 has a radially outer surface and a radially inner surface, and the internal threading 128 is on the radially inner surface. In the example illustrated, the first mold core 134 comprises a radial surface extending along the core axis 136 and defined at least in part by the first mold surface 134*a*, the radial surface for forming the sidewall 164 of the molded article 116. In the example illustrated, the radial surface of the first mold core 134 is directed radially outwardly for forming the internal threading 128 on the radially inner surface of the sidewall 164.

Referring to FIG. 5, the article second portion 126*b* may further include at least one retaining feature for one or more desired purposes in the finished article, but which may resist axial separation of the article second portion 126*b* relative to the mold core during ejection of the article from the mold. In the example illustrated, the article second portion 126*b* includes a retaining feature comprising a protrusion 170 (see also FIG. 3A) projecting axially along the article axis 130, inwardly of the endwall 154. In the example illustrated, the protrusion 170 comprises an annular sidewall that extends circumferentially about the article axis 130. In the example illustrated, the retaining feature (protrusion 170) comprises an undercut feature 172 adjacent an axially distal end of the protrusion 170. The undercut feature 172 is generally annular, and projects radially inwardly of an inner surface of the annular sidewall of the protrusion 170.

In the example illustrated, the retaining feature (protrusion 170 in the example illustrated) is configured to be formed by a retaining mold feature in the second mold surface 134*b* of the first mold core 134. In the example illustrated, the retaining mold feature comprises a protrusion mold feature 174 for forming the protrusion 170. In the example illustrated, the protrusion mold feature 174 comprises a protrusion mold cavity 176 in the axial endface of the first mold core 134. In the example illustrated, the protrusion mold feature 174 extends circumferentially about the core axis 136, and is generally annular in the example illustrated. The protrusion mold feature includes an annular recess extending radially inwardly from an outer radial surface of the mold core. In the example illustrated, an axially upper surface of the annular recess overlies and abuts an axially upper surface of the radially inwardly extending undercut feature when the article has been formed in the mold.

Once the article 116 has been formed in the mold, the retaining feature (e.g. protrusion 170) of the article 116 tends to hold the second article portion 126*b* in axial position relative to the mold core 134. In the example illustrated, upon initial unscrewing of the mold core 134 relative to the article 116 for ejection, the threads 128 exert an axial force on the article urging it away from the mold core 134 (upwards in FIGS. 4 and 5). The retaining feature resists this separation, and in the example illustrated, the axially upper surface of the annular recess exerts a downward force (FIG. 4) on the axially upper surface of the radially inwardly extending undercut feature.

Generally a feature such as an undercut is released by radially outward deflection of the article in the region of the undercut, once the axial separating force is strong enough to urge such radial deflection.

However, in some cases the increasing axial force may, prior to causing the desired radially outward deflection of the retaining feature, urge deformation or buckling of at least part of the article second portion and/or the connection portion of the article. If permitted to occur, such deformation or buckling could result in the article second portion 126*b* (including, for example, part or all of the endwall 154) being pulled axially inwards relative to the article first portion 126*a* as the article first portion 126*a* is translated axially relative to the core 134 during ejection. This could cause permanent damage to the molded article, particularly if, as is often the case, the molded article has only partially cooled prior to commencing the ejection (or demolding) process. In the example illustrated, the ejection-assist rib 144 can help prevent unwanted distortion of the article second portion, and can help disengagement of the protrusion 170 from the protrusion mold feature 174, by exerting an axial ejection force on the article second portion 126*b* adjacent the protrusion 170 during the initial unscrewing rotation.

In the example illustrated, the ejection-assist rib 144 is located radially adjacent to the protrusion 170, so that the axial ejection force exerted by the ejection-assist rib 144 on the article second portion 126*b* is sufficiently close to the protrusion 170 to eject the protrusion 170 from the protrusion mold feature 174 during the initial unscrewing rotation. In the example illustrated, the protrusion 170 is radially nearer the ejection-assist rib 144 relative to the internal threading 128. In the example illustrated, the internal threading 128 is spaced radially apart from the article axis 130 by a first radial distance 178, and the protrusion 170 is spaced radially apart from the article axis 130 by a second radial distance 180. In the example illustrated, the second radial distance 180 is less than half the first radial distance 178. In the example illustrated, the rib mold feature 150, protrusion mold feature 174, and thread mold 138 are spaced relative to each other in a corresponding manner. In the example illustrated, the protrusion 170 is adjacent, and defines at least a portion of, the dispensing orifice 122, which is coaxial with the article axis 130 in the example illustrated.

Figure 7:
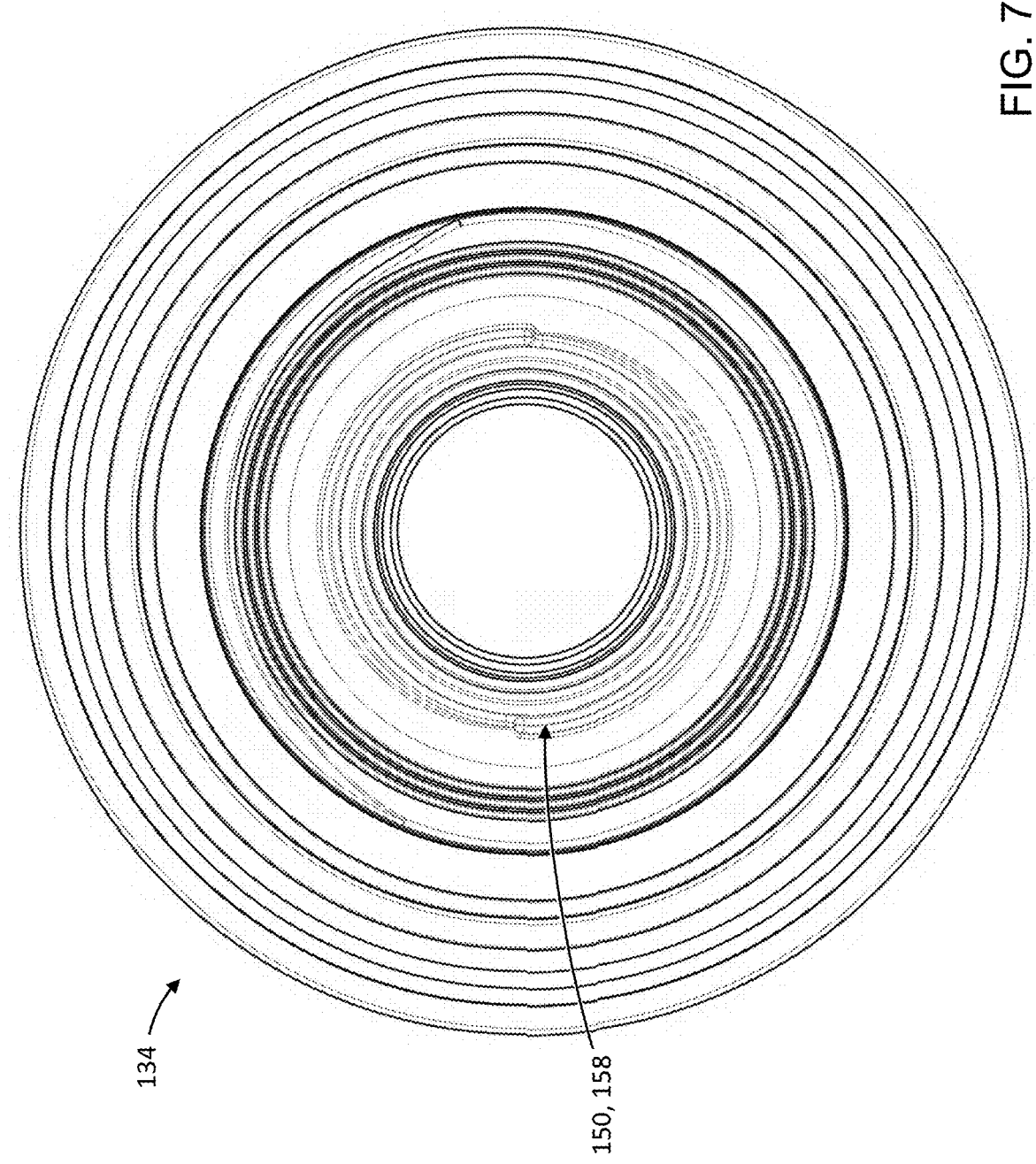
FIG. 7 is an end view of the core portion of FIG. 6.

Referring to FIG. 3A, in the example illustrated, the article second portion 126b comprises a plurality of the ejection-assist ribs 144. This can facilitate a more balanced ejection force exerted by the ribs 144 on the article second portion 126b. In the example illustrated, two ejection-assist ribs 144 are provided, and the ejection-assist ribs 144 are spaced circumferentially about the article axis at a common radius. In the example illustrated, the first end 145a of each rib adjoins the second end 145b of a circumferentially adjacent rib 144. Referring to FIG. 6, in the example illustrated, the first mold core 134 comprises a plurality of corresponding rib mold features 150 for forming the plurality of ejection-assist ribs 144. In the example illustrated, the rib mold features 150 are spaced circumferentially about the core axis 136 at a common radius (see also FIG. 7). In the example illustrated, the first end 159a of each rib mold feature 150 is open to the second end 159b of a circumferentially adjacent rib mold feature 150. Referring to FIGS. 3A and 6, in the example illustrated, the article second portion 126b comprises the two ejection-assist ribs 144, and the helical slide surface 146 of each rib 144 extends continuously over a circumferential arc of about 180 degrees.

In some examples, the helical slide surface of an ejection-assist rib 144 can extend continuously over a circumferential arc of, for example, between 45 and 360 degrees. In some examples, the molded article can include an ejection-assist rib defining a helical slide surface that extends continuously over a circumferential arc of up to 360 degrees. In some examples, molded articles can include a plurality of the ejection-assist ribs located at different radii.

Referring to FIG. 1A, in operation, after the molded article 116 is formed through injection of melt into the enclosed cavity formed by the first and second mold apparatuses 110, 112, the clamp load is relieved and the first platen 106 is translated away from the second platen 108 to open the mold. Referring to FIG. 4, during opening of the mold, the article 116 is retained on the first mold core 134 of the first mold apparatus 110 through engagement between the internal threading 128 and the thread mold 138 of the first mold core 134. Referring to FIG. 5, after the mold is opened, the first mold core 134 is rotated relative to the molded article 116 about the core axis 136 at a rotational rate, and the molded article 116 is simultaneously advanced relative to the first mold core 134 along the core axis 136 at an advancement rate corresponding to the rotational rate (e.g. through translation of the second mold core 152 relative to the first mold core 134) to unscrew the internal threading 128 from the first mold core 134.

During an initial rotation of the first mold core 134 relative to the molded article 116, the helical cavity surface 160 is circumferentially advanced relative to, and bears against, the helical slide surface 146 of the ejection-assist rib 144 to exert an axial ejection force on the article second portion 126b. The axial ejection force exerted by the ejection-assist rib 144 can help hold the article second portion 126b in axial position relative to the article first portion 126a as the molded article 116 first breaks free from the mold core 134 (i.e. commonly known as "mold break", wherein adhesion forces between a molded article as it contracts onto the mold core must first be broken). The axial ejection force exerted by the ejection-assist rib 144 can also or alternatively help hold the article second portion 126b in axial position relative to the article first portion 126a as the retaining feature (e.g. the protrusion 170) is disengaged from the corresponding mold feature (i.e. the protrusion mold cavity 176) of the mold core 134, thereby assisting in the desired demolding of the article second portion 126b from the first mold core 134. After being demolded and unscrewed from the first mold core 134, the molded article 116 is pushed off the second mold core 152 for ejection from the first mold apparatus 110.

Referring to FIG. 8, a portion of another example mold apparatus 1110 for forming a molded article 1116 is illustrated. The mold apparatus 1110 and the article 1116 have similarities to the apparatus 110 and the article 116, respectively, and like features are identified using like reference characters, incremented by 1000.

Figure 9A:
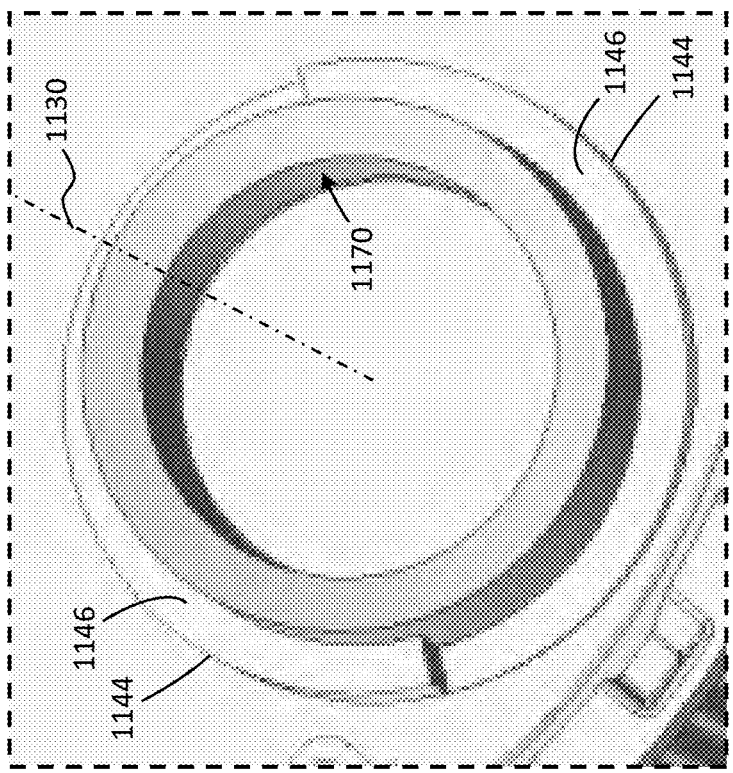
FIG. 9A is an enlarged view of a portion of FIG. 9.
Figure 9:
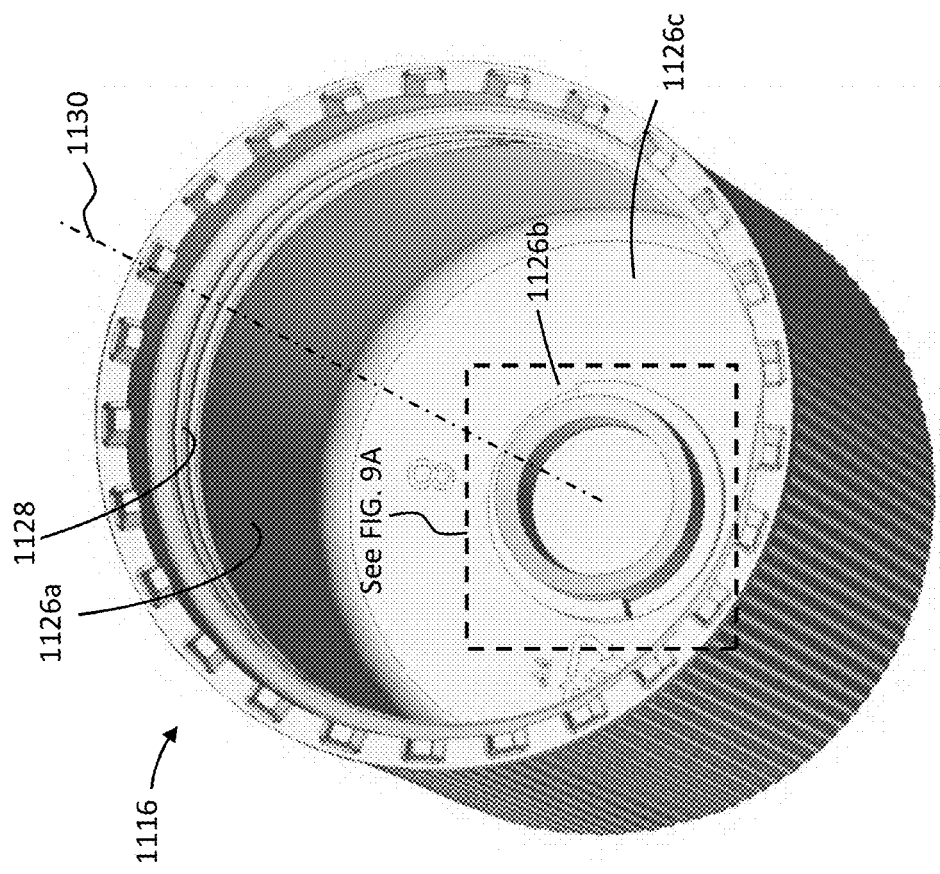
FIG. 9 is a bottom perspective view of the injection molded article of FIG. 8.

Referring to FIG. 9, in the example illustrated, the article 1116 comprises an article first portion 1126a having internal threading 1128 extending helically about an article axis 1130, and an article second portion 1126b spaced radially apart from the article first portion 1126a and connected to the article first portion 1126a by a connection portion 1126c. Referring to FIG. 9A, in the example illustrated, the article second portion 1126b comprises at least one ejection-assist rib 1144 defining a helical slide surface 1146 extending helically about the article axis 1130.

Referring to FIG. 8, in the example illustrated, the mold apparatus 1110 includes a mold core 1134 comprising a first mold surface 1134a for forming the article first portion 1126a. The first mold surface 1134a comprises a thread mold 1138 extending helically about the core axis 1136 for forming the internal threading 1128. The mold core 1134 further includes a second mold surface 1134b spaced radially apart from the first mold surface 1134a for forming the article second portion 1126b. Referring to FIG. 10, in the example illustrated, the second mold surface 1134b has at least one rib mold feature 1150 for forming the at least one ejection-assist rib 1144. Referring to FIG. 8, during an initial unscrewing rotation of the molded article 1116 relative to the mold core 1134, the rib mold feature 1150 of the mold core 1134 bears against the helical slide surface 1146 of the ejection-assist rib 1144 to urge the article second portion 1126b axially away from the mold core 1134 during ejection of the molded article 1116.

In the example illustrated, the article second portion 1126b and the connection portion 1126c define an axial endwall 1154 of the injection molded article 1116, and the ejection-assist rib 1144 projects axially from an interior surface of the endwall 1154 to an axial endface defining the helical slide surface 1146. In the example illustrated, the endwall 1154 is generally planar, and extends radially inwardly from the article first portion 1126a to the article axis 1130.

Referring to FIG. 10, the second mold surface 1134b defines a portion of an axial endface of the mold core 1134 for forming the endwall 1154. In the example illustrated, the rib mold feature 1150 comprises a rib mold cavity 1158 in the axial endface of the mold core 1134. In the example illustrated, the rib mold cavity 1158 extends along the core axis 1136 to an axially inner end of the cavity 1158. The axially inner end of the cavity 1158 defines a helical cavity surface 1160 extending helically about the core axis 1136 for forming and bearing against the helical slide surface 1146 of the molded article 1116.

Referring to FIG. 9A, in the example illustrated, the article second portion 1126b further includes at least one retaining feature, and in the example illustrated, the retaining feature is provided in the form of a protrusion 1170 projecting axially along the article axis 1130. In the example illustrated, the protrusion 1170 comprises a generally annular sidewall and acts as a sealing feature of the article 1116. In the example illustrated, the ejection-assist rib 1144 is located radially adjacent the protrusion 1170. In the example illustrated, the ejection-assist rib 1144 radially adjoins the protrusion 1170. Referring to FIG. 10, the protrusion 1170 is configured to be formed by a protrusion mold feature 1174 in the second mold surface 1134*b* of the mold core 1134. In the example illustrated, the protrusion mold feature 1174 comprises a protrusion mold cavity 1176 in the axial endface of the first mold core 1134. In the example illustrated, the rib mold cavity 1158 radially adjoins and is radially open to the protrusion mold cavity 1176.

What is claimed is:

1. An injection molded article comprising:
   a) an article first portion having internal threading extending helically about an article axis, the threading configured to be formed by a thread mold in a mold core; and
   b) an article second portion spaced radially apart from the article first portion and connected to the article first portion by a connection portion, the article second portion having at least one ejection-assist rib configured to be formed by at least one rib mold feature in the mold core, the ejection-assist rib defining a helical slide surface extending helically about the article axis, wherein during an initial unscrewing rotation of the molded article relative to the mold core, the rib mold feature of the mold core bears against the slide surface of the ejection-assist rib to urge the article second portion axially away from the mold core during ejection of the molded article from the mold core; and
   wherein the ejection-assist rib extends circumferentially from a first end to a second end, and has an axial thickness increasing from the first end to the second end.

2. The injection molded article of claim 1, wherein the ejection-assist rib projects axially along the article axis to an axial endface of the rib, the axial endface of the rib defining the helical slide surface.

3. The injection molded article of claim 1, wherein the article second portion includes at least one retaining feature projecting axially along the article axis and configured to be formed by a retaining mold feature in the mold core.

4. The injection molded article of claim 3, wherein the retaining feature comprises a protrusion radially adjacent the ejection-assist rib.

5. The injection molded article of claim 1, wherein the article comprises an axial endwall defined at least in part by the article second portion and the connection portion, the axial endwall configured to be formed by an axial endface of the mold core, wherein the axial endface of the mold core comprises the rib mold feature.

6. The injection molded article of claim 5, wherein the article comprises a radial sidewall defined at least in part by the article first portion, the sidewall configured to be formed by a radial surface of the mold core.

7. The injection molded article of claim 1, wherein the article second portion comprises a plurality of the ejection-assist ribs.

8. The injection molded article of claim 1, wherein the article second portion is spaced radially inwardly apart from the article first portion by the connection portion.

9. The injection molded article of claim 1, wherein the helical slide surface and the internal threading have a common pitch.

10. The injection molded article of claim 1, wherein the helical slide surface extends circumferentially over an arc of at least 90 degrees.

11. The injection molded article of claim 1, wherein the article second portion comprises two said ejection-assist ribs, and wherein the helical slide surface of each rib extends continuously over a circumferential arc of 180 degrees.

12. The injection molded article of claim 1, further comprising a protrusion projecting along the article axis from an interior face, the protrusion spaced radially apart from the internal threading, and the at least one ejection-assist rib spaced radially inward of the internal threading and the protrusion spaced radially inward of the rib.

13. The injection molded article of claim 12, wherein the protrusion extends circumferentially about the article axis.

14. The injection molded article of claim 13, wherein the protrusion is generally annular.

15. The injection molded article of claim 1, wherein the molded article comprises a closure for a container.

16. An injection molded article comprising:
   a) an article first portion having internal threading extending helically about an article axis, the threading configured to be formed by a thread mold in a mold core; and
   b) an article second portion spaced radially apart from the article first portion and connected to the article first portion by a connection portion, the article second portion having at least one ejection-assist rib configured to be formed by at least one rib mold feature in the mold core, the ejection-assist rib defining a helical slide surface extending helically about the article axis, wherein during an initial unscrewing rotation of the molded article relative to the mold core, the rib mold feature of the mold core bears against the slide surface of the ejection-assist rib to urge the article second portion axially away from the mold core during ejection of the molded article from the mold core;
   wherein the article second portion includes at least one retaining feature projecting axially along the article axis and configured to be formed by a retaining mold feature in the mold core, and wherein the retaining feature comprises a protrusion radially adjacent the ejection-assist rib.

17. The injection molded article of claim 16, wherein the helical slide surface and the internal threading have a common pitch.

18. An injection molded article comprising:
   a) an article first portion having internal threading extending helically about an article axis, the threading configured to be formed by a thread mold in a mold core; and
   b) an article second portion spaced radially apart from the article first portion and connected to the article first portion by a connection portion, the article second portion having at least one ejection-assist rib configured to be formed by at least one rib mold feature in the mold core, the ejection-assist rib defining a helical slide surface extending helically about the article axis, wherein during an initial unscrewing rotation of the molded article relative to the mold core, the rib mold feature of the mold core bears against the slide surface of the ejection-assist rib to urge the article second portion axially away from the mold core during ejection of the molded article from the mold core; and wherein the article second portion comprises two said ejection-assist ribs, and wherein the helical slide surface of each rib extends continuously over a circumferential arc of 180 degrees.

19. The injection molded article of claim 18, wherein the helical slide surface and the internal threading have a common pitch.

* * * * *